United States Patent
Hines et al.

(10) Patent No.: US 6,398,149 B1
(45) Date of Patent: Jun. 4, 2002

(54) CABLE MANAGEMENT SYSTEM WITH ADJUSTABLE CABLE SPOOLS

(75) Inventors: Michael J. Hines, Ivoryton; Samuel E. Watrous, Ledyard; Suzanne L. Spera, Groton, all of CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 09/761,338

(22) Filed: Jan. 16, 2001

(51) Int. Cl.[7] .............................. B65H 75/38; G02B 6/00
(52) U.S. Cl. ................. 242/399; 242/388.6; 242/400.1; 242/401; 242/597.1; 242/597.3; 385/135
(58) Field of Search ............................... 242/399, 388.6, 242/400.1, 401, 404.2, 597.1, 597.3, 592, 594.5; 385/135, 134; 312/223.6; 248/59, 297.21; 211/26; 361/826, 827

(56) References Cited

U.S. PATENT DOCUMENTS

| | | | |
|---|---|---|---|
| 2,519,396 A | * 8/1950 | Peterson et al. | 242/404.2 |
| 2,721,711 A | * 10/1955 | Torzewski | 242/400.1 |
| 2,859,710 A | * 11/1958 | Elsner | 248/297.21 |
| 3,791,606 A | 2/1974 | Brown | |
| 4,667,896 A | 5/1987 | Frey et al. | |
| 4,752,047 A | 6/1988 | Franks, Jr. | |
| 4,866,215 A | 9/1989 | Muller et al. | |
| 4,938,432 A | 7/1990 | Kurt et al. | |
| 5,073,841 A | 12/1991 | DelGuidice et al. | |
| 5,175,673 A | 12/1992 | Roger et al. | |
| 5,286,919 A | 2/1994 | Benson et al. | |
| 5,316,243 A | 5/1994 | Hennberger | |
| 5,352,854 A | 10/1994 | Comerci et al. | |
| 5,429,431 A | 7/1995 | Olson et al. | |
| 5,432,505 A | 7/1995 | Wise | |
| 5,451,101 A | 9/1995 | Ellison et al. | |
| 5,640,482 A | 6/1997 | Barry et al. | |
| 5,734,774 A | * 3/1998 | Morrell | 385/135 |
| 5,775,621 A | 7/1998 | Sauber | |
| 5,788,087 A | 8/1998 | Orlando | |
| 5,836,551 A | 11/1998 | Orlando | |
| 5,839,702 A | 11/1998 | Jette | |
| 5,860,713 A | 1/1999 | Richardson | |
| 5,868,345 A | * 2/1999 | Beisser | 242/592 |
| 5,893,539 A | 4/1999 | Tran et al. | |
| 5,946,440 A | 8/1999 | Puetz | |
| 5,957,556 A | 9/1999 | Singer et al. | |
| 5,967,451 A | 10/1999 | Radaios | |
| 6,012,683 A | 1/2000 | Howell | |
| 6,016,252 A | 1/2000 | Pignolet et al. | |
| 6,019,323 A | 2/2000 | Jette | |
| 6,039,280 A | * 3/2000 | Stephens et al. | 242/399 |
| 6,067,233 A | 5/2000 | English et al. | |
| 6,101,773 A | 8/2000 | Chau et al. | |
| 6,102,214 A | 8/2000 | Mendoza | |
| 6,164,582 A | * 12/2000 | Vara | 242/400.1 |

FOREIGN PATENT DOCUMENTS

| | | | |
|---|---|---|---|
| JP | 6-208024 | * 7/1994 | 385/135 |

* cited by examiner

*Primary Examiner*—John M. Jillions
(74) *Attorney, Agent, or Firm*—Cummings & Lockwood

(57) ABSTRACT

The present invention teaches a cable management system for supporting and routing cables. The cable management system includes one or more cable supports attached to a support structure such as a wall or electronics cabinet. Each cable support includes one or more cable spools detachably mounted to a spool guide. The spool guide includes a channel extending along its length and in-turned flanges that extend partially across the opening of the channel. Each cable spool includes a spool body and a coupler. The coupler has a retractable brace that can be inserted into the channel, rotated and retracted toward the spool body for clamping the in-turned flanges between the brace and the spool body.

27 Claims, 8 Drawing Sheets

CABLE MANAGEMENT SYSTEM WITH ADJUSTABLE CABLE SPOOLS

BACKGROUND OF THE INVENTION

1. Field of the Invention

The present invention relates to a novel cable management system. More specifically, the present invention relates to a cable management system which includes one or more cable supports, each cable support including at least one cable spool that is adjustable along the length of, and detachable from a spool guide.

2. Brief Description of the Related Art

Wiring systems within buildings are often terminated in a central wiring locality, such as a communication closet, where they may be interconnected with one another, and/or to other cabling systems or telecommunications equipment. Cables are often terminated on wire panels, such as a patch panel or the like, which are frequently mounted to either racks, or stand-off brackets affixed to a wall. This type of localization is typically referred to as a cross-connect system where the cross-connection is typically from the cables emanating outside the office environment to the individual work stations within the office environment. While accumulation of cables is desirable from an interconnection and changeability standpoint, where a large group of cables are accumulated in any one area, the cables become difficult to manage.

Cable management racks and brackets, described collectively herein as "cable management systems," are designed to permit the installation, organization, routing and protection of all types of cable, including traditional metal wire and fiber-optic cables. Such systems help manage difficult to accommodate and/or bulky cables used to provide communication paths between electrical components.

Cable management systems proffer many advantages. For one, they permit easier access to electrical components housed within the rack itself. They also make it easier and less time consuming to find a particular cable or circuit during equipment maintenance and during downtimes. By removing loose cables from a position in which they may be snagged, disturbed by casual contact, or they may interfere with the operation of another electrical device or cable, such management systems reduce safety hazards and improve efficiency. Cable management systems also help to prevent cables from becoming entangled and provide strain relief. In addition, they also help prevent sharp bending of the cables which can damage fibers therein, and the undesirable attenuation of signals, in particular optical signals, during transmission. Furthermore, such systems help reduce the unaesthetic appearance of a multitude of cables that are seemingly just hanging about.

The diverse and widespread nature of telecommunications devices requires that a modern building have an effective and efficient telecommunications infrastructure to support the same. Cables extending to an interconnection site in an office need to be efficiently connected to cables extending to various locations within the premise. Often times, wiring systems within buildings are terminated in a central wiring system where they may be interconnected to one another and/or other cabling systems. Cables are frequently terminated in a patch panel housed in the central wiring system, and subsequently interconnected to other cables or telecommunications equipment. Patch panels provide a convenient way to access and change the connections. Cable management systems provide a framework in which cables may terminate or interconnect with other cables so as to facilitate centralized administration of data transmissions and data processing. Cable management systems often provide means for mounting patch panels thereto so as to provide easy mating of connectors. Of course, other electronic modules, such as switching and routing modules, and a wide variety of other telecommunication and data equipment, may also be stacked in such systems. Patch panels and other electronic modules are typically connected to the cable management systems by bolts or screws. As disclosed in U.S. Pat. No. 5,788,087, the disclosure of which is incorporated in its entirety herein, patch panels may also be hingedly connected to the cable management system.

Cable management systems may include a frame defining a bay formed between two spaced-apart vertical walls, the bay being sized for receiving electronic modules. The system may includes one or more cable supports attached to the frame, and include one or more vertical channels sized for receiving a plurality of cross-connect cables. The open framework provides for holding electronic modules of various types and sizes at positions in a columnar fashion, as described, for example, in U.S. Pat. No. 5,640,482. Cable management systems such as the Mighty Mo® cable management rack by Ortronics, Inc., (New London, Conn.) typically include a framework having multiple fixed positions thereon wherein electronic modules may be attached and cable supports may be affixed. Cable supports may include rings or brackets through which a cable may be threaded or routed. As is known to those of ordinary skill in the art, cable supports may include guides of other shapes, such as G- or C-shaped guides as described in U.S. Pat. Nos. 5,893,539 and 5,839,702.

In routing cable, it is important that the cables are not strained, and that the bend radius not be too great. For example, it is recognized that optical fibers should not be bent less than a minimum radius of curvature or damage to the fibers may result. Optimal routing of a cable in one application may not be optimal in another application. There is a need for some degree of flexibility in the cable management system such that wiring may be easily re-routed to meet changing needs of users. A deficiency in conventional cable management systems is that they do not provide the degree of ease and adaptability desired when modifying the routing of cable, as for example when new equipment is added to the rack. The degree of adaptability provided by conventional racks with limited cable support positions may not be enough.

Routing paths should not only be adaptable, but they should also be optimal. For example, when a hair-thin optical fiber is housed within a cable, excess bending of the cable may result in improper functioning. The cable supports of a standard cable management system may not be able to be positioned easily by the installer to maintain cable bend radii that are sufficiently large to minimize or eliminate damage to fibers in cables. Furthermore, present cable management systems require a considerable amount of time in order to reposition the cable positions in the manner desired.

There accordingly is a need for a cable management system that permits routing of cable in an orderly manner, that permits easy modification of cable routes to permit optimally efficient routing of cable to accommodate the ever-changing telecommunication needs of system users, that permits easy installation of cable supports and routing of the cable, which maintains the cables in an accessible manner for later servicing and repair, and provides for efficient separation, isolation and removal of cables.

SUMMARY OF THE INVENTION

The present invention provides a cable management system having improved flexibility in management of communication cables. Such flexibility permits the routing of cables in an orderly manner, permits easy modification of cable routes to allow optimally efficient routing of the cable as telecommunication needs change, permits easy installation and routing of cables, maintains cables in an accessible manner for later servicing and repair, and provides for efficient separation, isolation and removal of cables. Flexibility is permitted by adapting and configuring one or more cable spools to move along a track of a spool guide and to be removable therefrom.

Conventional cable management systems have relied upon cable guides which are fixed on the vertical rails of a rack and have a finite number of positions along the vertical rails. The cable guides may comprise a number of spools that are fastened onto vertical rails of the rack using "U" bolts. Conventional systems such as these have proven difficult and inflexible in use, particularly when mixing one manufacturer's rack with another manufacturer's patch panel equipment and/or devices for cable management. When a spool is mounted in a fixed position as described above, it often does not align properly with patch panels that are installed in the rack.

The present invention permits positioning of cable spools, which provides excellent installation flexibility for field technicians. The invention reduces labor costs associated with traditional rack installations by eliminating the need to bolt each cable spool in place. In addition, the invention permits an installer to assemble and mount cable spools by hand, frontally and without the use of tools.

In one embodiment of the present invention there is provided a cable spool which is activated to slide along a track. The cable spool may be easily positioned with respect to the track. Rotation of the cable spool by ninety degrees (90°) permits removal of the cable spool from the track. The process for replacing the cable spool is simply the reversal of the process for removing it.

In another embodiment of the present invention there is disclosed a cable management system for enabling support and routing of cable and providing means for coupling a plurality of cross-connect modules, said cable management system comprising:
(a) a framework including at least a pair of vertical frame members spaced apart and configured for affixing cross-connect modules at sites in vertical stack arrangement between each pair of vertical frame members and comprising one or more tracks having one or more transverse channels therein; (b) at least one cable spool comprising structure capable of supporting cable, and a coupler connected to such cable spool, said cable spool being operatively configured to permit positional engagement and disengagement of the coupler along the traverse of said track.

In yet another embodiment of the present invention there is disclosed a cable spool for supporting and routing cable on a telecommunications rack or bracket, said cable spool comprising: (a) a spool top, base and body defining a recess that transverses from said spool top to said spool base; (b) lateral supports extending laterally from the spool body; (c) a plunger extending through said spool recess from said spool top to said spool base; (d) a brace extending from the spool base end of said plunger, the dimensions of the brace being such that when coupled to the plunger the brace cannot be drawn within said spool recess; and (e) a resilient member operatively connected to said plunger such that when said plunger is moved from a first position to a second position along said spool recess, said resilient member is compressed and applies a force to return said plunger towards said first position. The lateral supports may comprise any structure that supports cable, or circumscribes the area in which the cable placed about the spool body may travel if such unravels. A useful embodiment comprises a bi-lateral support structure forming a U-shape. Such bi-lateral support may comprise continuous wire passing through the spool. The resilient member may comprise any device or body that substantially recovers its shape or position when released after being distorted. For example, by "resilient member" it is meant to include a coil spring, an elastic substrate, a compressible fluid chamber, and other such items and devices known to those of ordinary skill in the art, and similar items which may be invented or found during the pendency of this application and thereafter. By "spool body" it is meant a part having any dimension and shape about which a cable may be wrapped. By "plunger" it is meant an elongated structure that can be moved in the spool recess.

The invention also comprises a rack for mounting cross-connect modules and managing cable, the rack comprising: (a) a frame defining one or more bays formed between two spaced-apart vertical end walls, said bay(s) being sized for receiving one or more cross-connect modules; (b) one or more tracks having a top end and a base end, said track(s) attached to said frame and defining one or more channels traversing from said top end to said base end of said track(s); and (c) one or more cable spools comprising structure capable of supporting cable, coupled to said track(s), and operatively configured so as permit positional engagement and disengagement of the cable spool(s) along the traverse of said track(s).

In yet another embodiment of the present invention there is disclosed a mounting brace and cable management apparatus comprising: (a) a rigid bar having a track therein; (b) a cable spool comprising structure capable of supporting cable, coupled to said track, and operatively configured so as permit positional engagement and disengagement of the cable spool along the traverse of said track.

The present invention further comprises a cable management apparatus comprising: (a) a framework including a rail, said rail vertically oriented and including a track traversing said rail; (b) a cable spool comprising a brace dimensioned so as to be capable of coupling with said track, said cable spool operatively configured so as to permit positional engagement and disengagement of the cable spool along the traverse of said track.

And in yet another embodiment of the present invention there is disclosed a cable management apparatus comprising: (a) a framework including a rail, said rail including a track traversing said rail; (b) a cable spool for supporting and routing cable, said cable spool operatively configured to permit positional coupling and de-coupling along the traverse of said track and comprising (i) a top, base and body that define a recess that transverses from said spool top to said spool base; (ii) lateral supports extending laterally from said spool body; (iii) a plunger extending through said spool recess from said spool top to said spool base; (iv) a brace extending from the spool base end of said plunger, the dimensions of said brace being such that when coupled to the plunger, said brace cannot be drawn within said spool recess; (v) a resilient member operatively connected to said plunger such that when said plunger is moved from a first position to a second position along said spool recess from said spool top to said spool base, said resilient member is compressed and applies force to return said plunger towards said first position.

The above-discussed features and other features and advantages of the present invention will be further appreciated and understood by those of ordinary skill in the art from the following detailed description and drawings.

DETAILED DESCRIPTION OF THE INVENTION

Reference will now be made in detail to exemplary aspects of the present invention that are illustrated in the accompanying drawings. Wherever possible, the same reference numbers will be used throughout the drawings to refer to the same or like parts.

Figure 1:
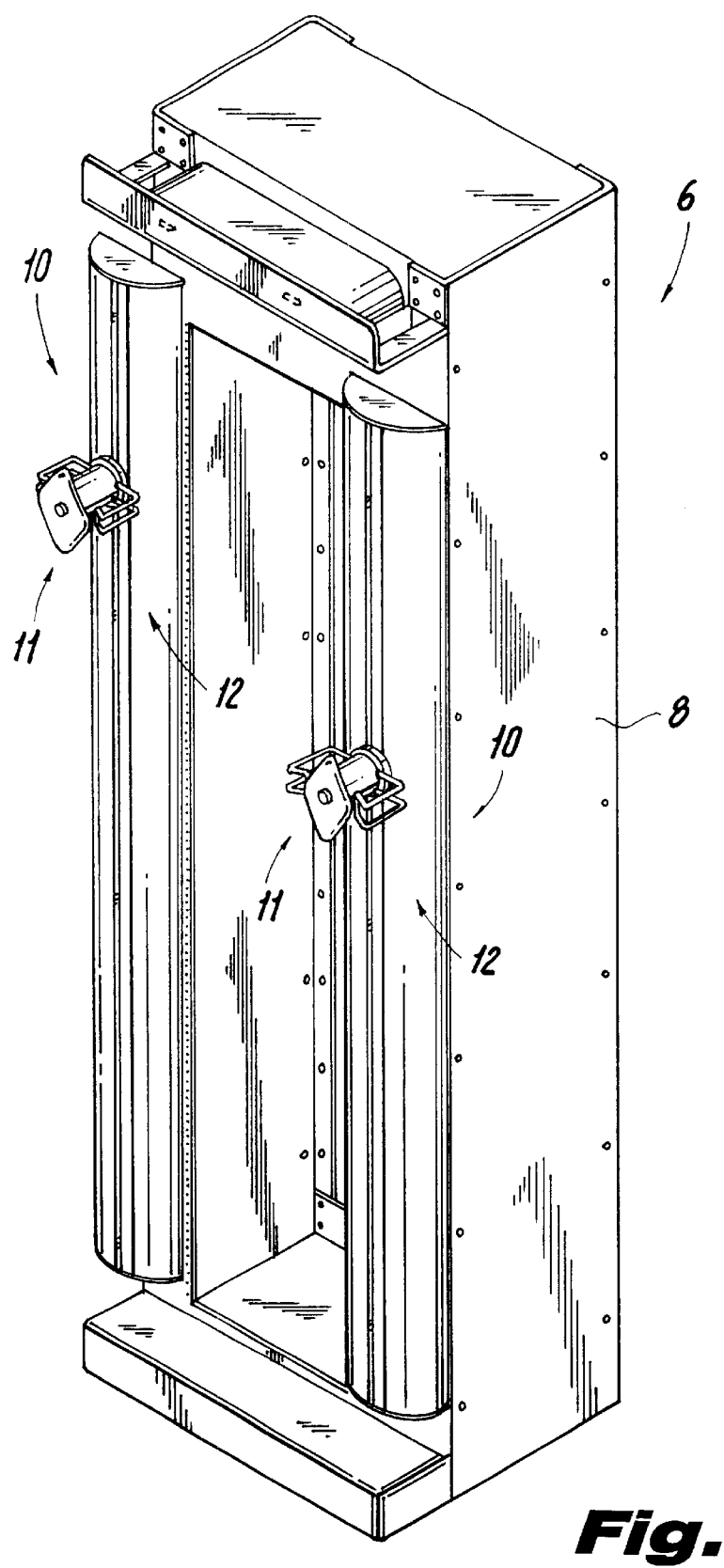
FIG. 1 is a perspective view of a cable management system.

FIG. 1 is a perspective view of a cable management system 6 including a cabinet with vertical frame members 8. A cable support 10 is attached to each vertical frame member. The cable supports 10 each include a spool guide 11 to which is attached one or more cable spools 12. Each cable spool 12 can be adjusted vertically up or down, or removed. The number of cable spools 12 used depends on the number of cables that are to be supported by cable management system 6 and/or the complexity of the routing of the cables. Those of ordinary skill in the art will appreciate that although the cable supports 10 are shown mounted vertically and on the front of cabinet 8, cable supports 10 can be mounted in other locations and positions.

Figure 2:
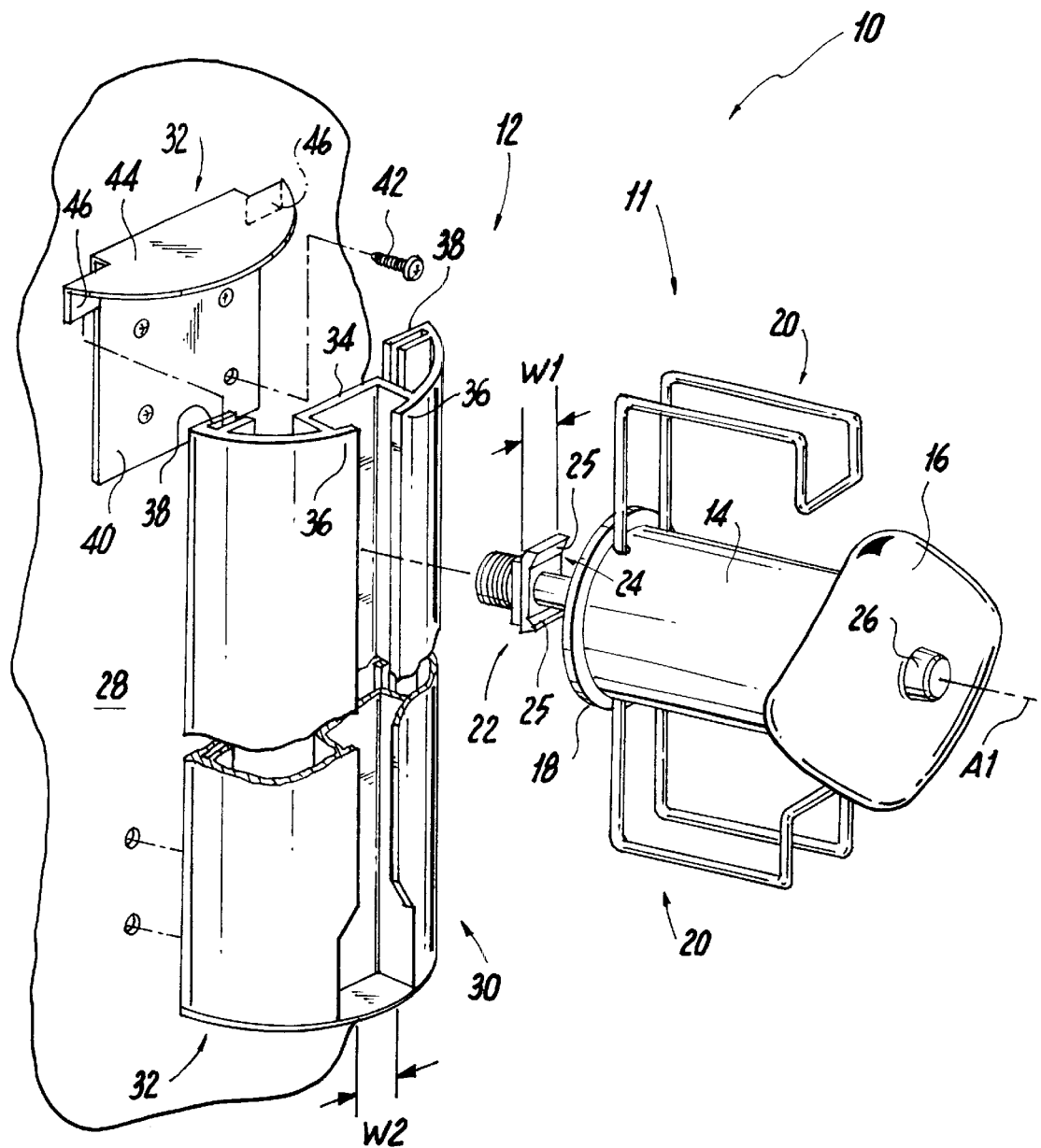
FIG. 2 is a perspective view of a cable support that may be used in the cable management system illustrated in FIG. 1.

FIG. 2 is a perspective view of a cable support 10 including a cable spool 11 and a spool guide 12. The cable spool 11 includes a spool body 14, top 16, base 18, lateral supports 20 and a coupler 22. The coupler 22 includes a spring-biased brace 24 that is extendable in a direction away from the base 18 by depressing a button 26 located in the center of the spool top 16. The brace 24 includes two engagement ribs 25 and has a width of W1.

The cable spool 11 is mounted to a supporting structure 28, such as a cabinet or wall, with spool guide 12. The spool guide 12 includes a track 30 and two mounting brackets 32. The track 30, which is generally semi-circular in cross-section, includes a channel 34 and two in-turned flanges 36 that extend down the front of the track 30. The in-turned flanges 36 reduce the opening to channel 34 to a width of W2. It is notable that width W2 between the in-turned flanges 36 is greater than the width W1 of brace 24, therefore, brace 24 can readily pass between the in-turned flanges 36 and into the channel 34. The track 30 also includes a pair of slotted flanges 38 whose slots face one another and extend down the rear of track 30.

It is anticipated that an embodiment of the present invention may substitute two outwardly-turned flanges (not shown) for the two in-turned flanges 36. In such case, the brace 24 would have a C-shaped cross-section in order to grip the two outwardly-turned flanges.

The procedure for mounting cable spool 11 to spool guide 12 includes depressing button 26, passing brace 24 between in-turned flanges 36, rotating cable spool 11 ninety degrees (90°) in either the clockwise or counterclockwise direction about axis A1, and releasing button 26. When button 26 is released, the in-turned flanges 36 are clamped between the engagement ribs 25 of brace 24 and the spool base 18. The cable spool 11 is readily adjusted in the vertical direction by depressing button 26 and shifting the cable spool 11 up or down.

The mounting bracket 32 includes a base plate 40, which is secured to the supporting structure 28 with fasteners 42. A flange 44 extends from the base plate 40 for capping the top and bottom openings of track 30. The flange 44 includes two tabs 46 configured for engaging the slots in slotted flanges 38.

Figure 3:
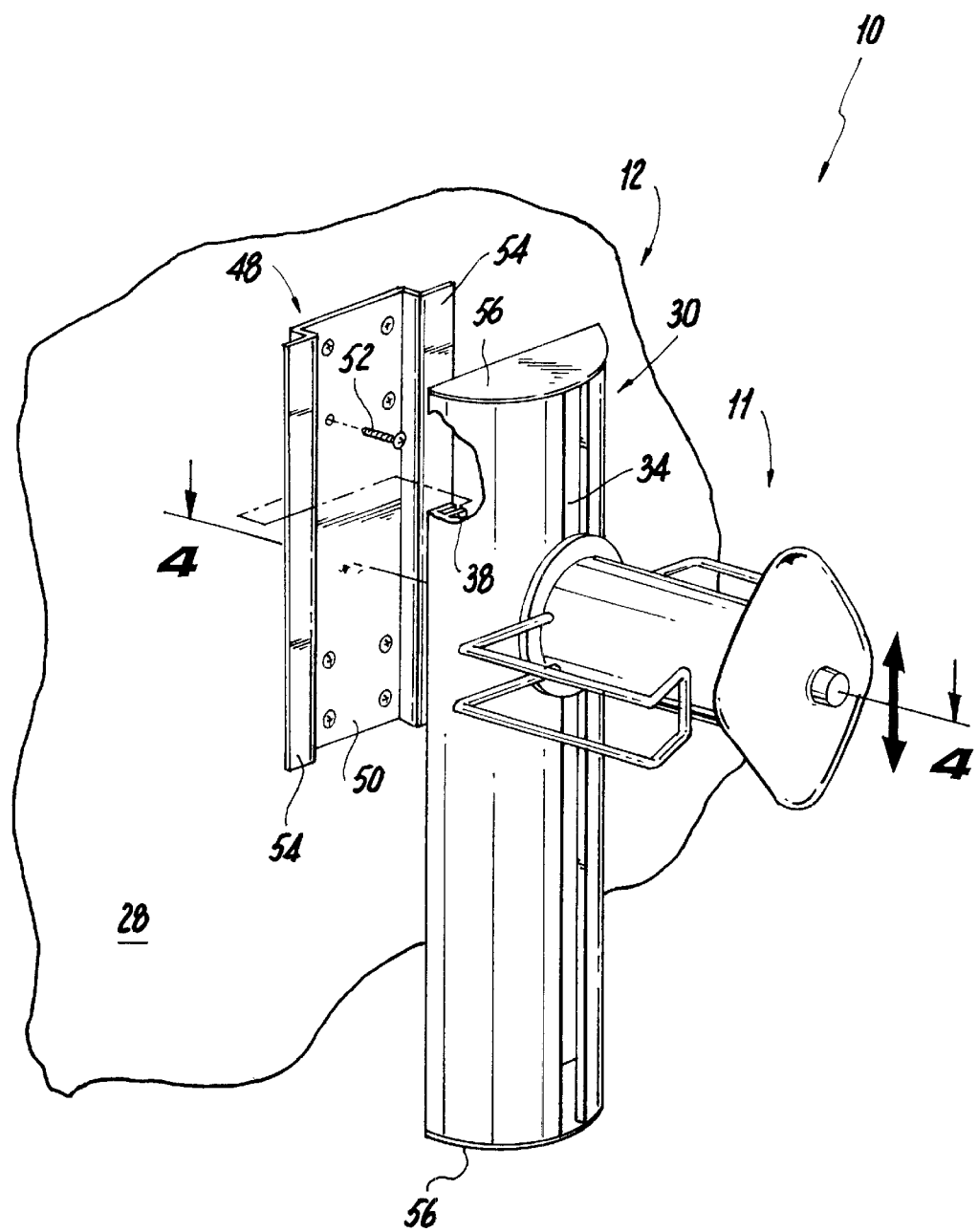
FIG. 3 is a perspective view of the cable support illustrated in FIG. 2, however, including an alternated embodiment mounting bracket.

FIG. 3 is a perspective view of the cable support 10 similar to FIG. 2, though, after the cable spool 11 has been attached to spool guide 12. In this embodiment, however, the spool guide 12 includes an alternate embodiment mounting bracket 48. Mounting bracket 48 includes a base plate 50, which is secured to supporting structure 28 with fasteners 52. Various types of fasteners can be used. The type selected depends on the particular installation requirements. In certain cases it may be advantageous to use presson type fasteners such as push-mount blind rivets, tree rivets, or push-in panel rivets. Two flanges 54 extend from the sides of base plate 50 and are configured to engage the slots in slotted flanges 38 of track 30. Blanking plates 56 are used for capping the top and bottom openings of track 30.

Figure 4:
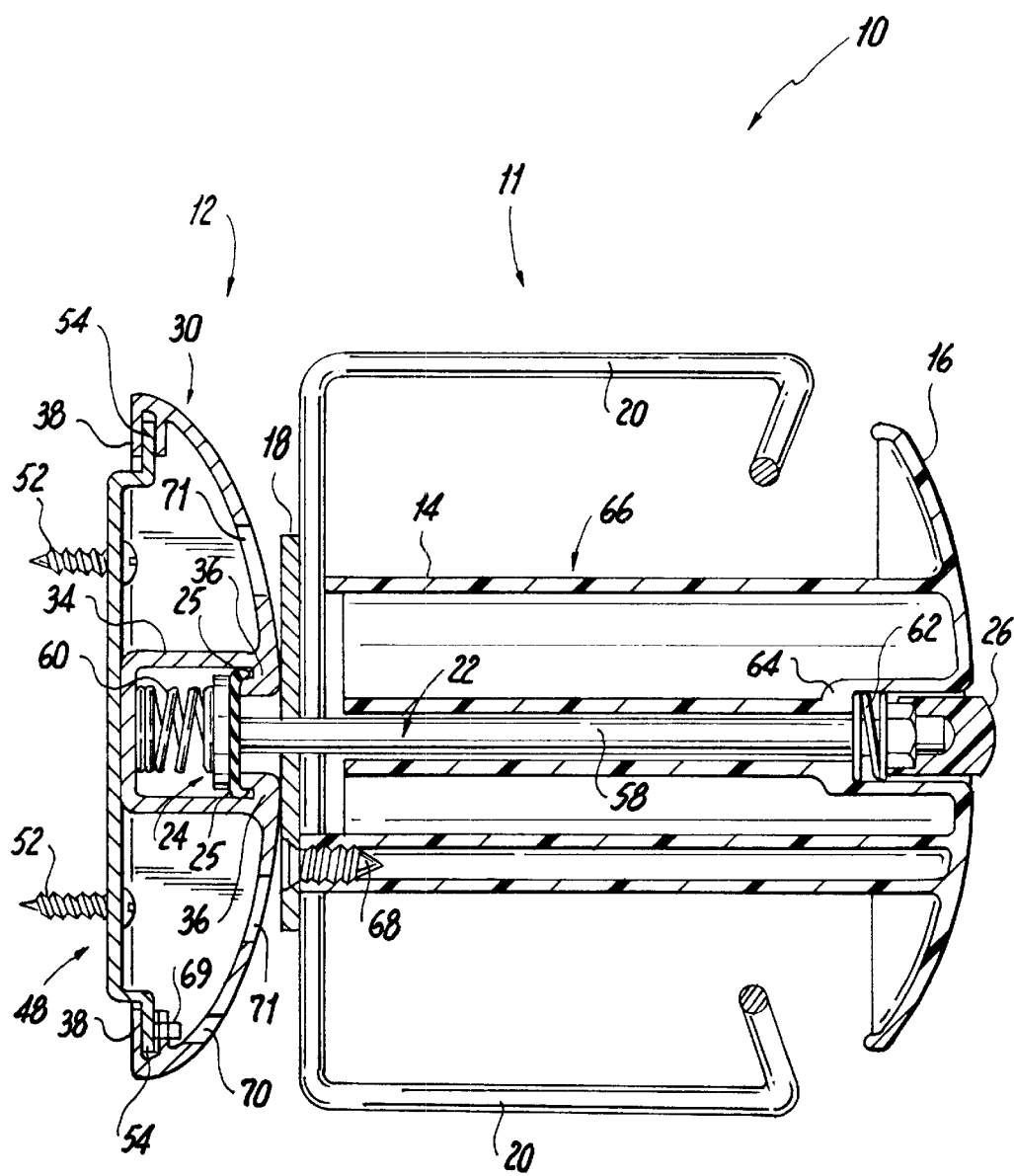
FIG. 4 is a cross-sectional view of the cable support illustrated in FIG. 3 as viewed along line 4—4.

FIG. 4 is a cross-sectional view of cable support 10 as viewed along line 4—4 of FIG. 3. Button 26 is secured to a plunger 58, which in turn is secured to brace 24. Brace 24 is shown in such embodiment to be operatively connected to resilient member 60 and resilient member 62, such that upon depression and release of button 26, button 26 returns to its pre-depressed position. Shoulder 64 within cable spool 11 acts as a seat for resilient member 62 and prevents further movement of button 26 when button 26 is depressed. The in-turned flanges 36 are shown clamped between the engagement ribs 25 of brace 24 and the spool base 18.

In the embodiment illustrated, cable spool 11 includes a uni-piece spool 66, wherein spool body 14 and spool top 16 are molded as a single component. The lateral supports 20 are secured in position between uni-piece spool 66 and spool base 18 by way of one or more fasteners 68. The lateral supports 20 can be made from a single piece of wire that is bent as shown and butt welded, or made as separate components.

Spool guide 12 is shown assembled so that the flanges 54 of mounting bracket 48 are engaged with the slots in the slotted flanges 38 of track 30. The mounting bracket 48 can be more positively secured to track 30 by including, for example, a set screw 69 in at lease one of the slotted flanges 38. The set screw 69 can be made accessible by including an access hole 70 in track 30. The mounting bracket 48 can be mounted to supporting structure 28 prior to assembling track 30 thereto or the mounting bracket 48 and track 30 can be mounted as a single unit. If the spool guide 12 is assembled prior to mounting, access holes 71 can be provided in track 30 for securing the fasteners 52 to the supporting structure 28.

Figure 5:
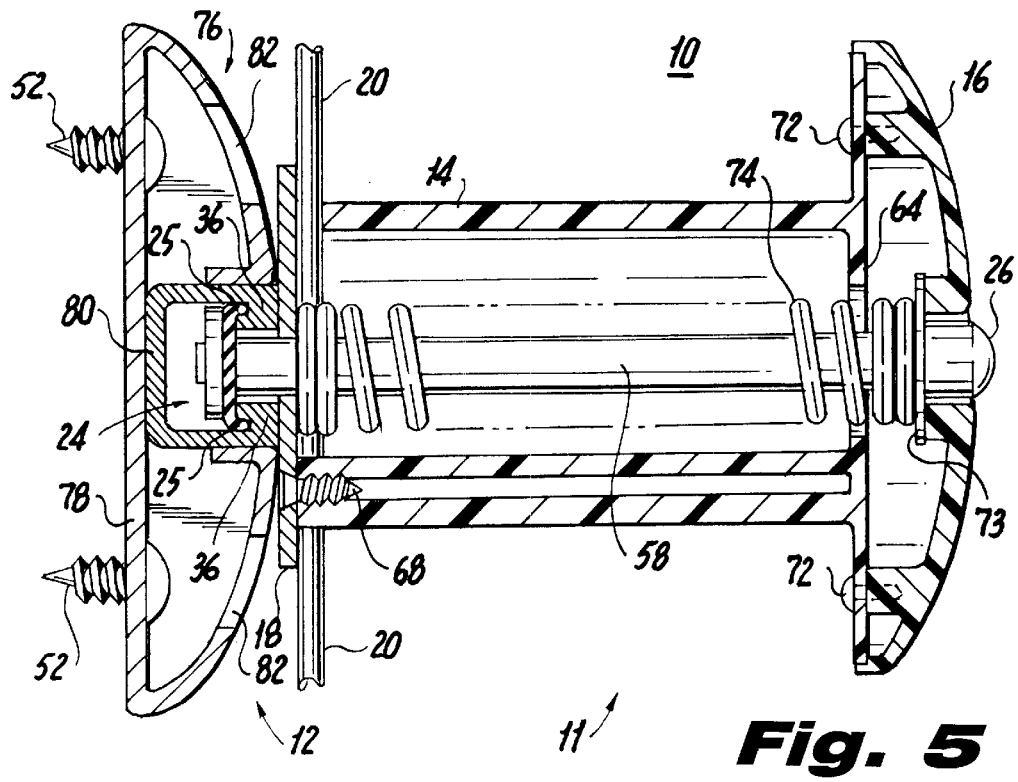
FIG. 5 is a cross-sectional view similar to FIG. 4 of an alternative embodiment cable support.

FIG. 5 is a cross-sectional view, similar to FIG. 4, of another embodiment of the cable support 10. In this embodiment, spool body 14 is secured to spool top 16 with fasteners 72. Button 26 includes a collar 73 and is secured to plunger 58, which in turn is secured to brace 24. A resilient member 74 is mounted on plunger 58 and positioned between collar 73 and spool base 18 such that upon depression and release of button 26, button 26 returns to its pre-depressed position. Shoulder 64 of spool body 14 acts as a stop to prevent further movement of button 26 when button 26 is depressed and collar 73 contacts shoulder 64. The lateral supports 20 are secured in position between spool body 14 and spool base 18 by way of one or more fasteners 68.

Another embodiment of the spool guide 12 is shown to include a track 76 having a molded-in base plate 78. A separate flanged channel insert 80 is attached with, for example, fasteners or adhesives. The flanged channel insert 80 includes in-turned flanges 36. The in-turned flanges 36 are shown clamped between the engagement ribs 25 of brace 24 and the spool base 18. Fasteners 52 are used to secure track 76 to supporting structure 28. Access holes 82 are provided in track 76 for securing the fasteners 52.

Figure 6:
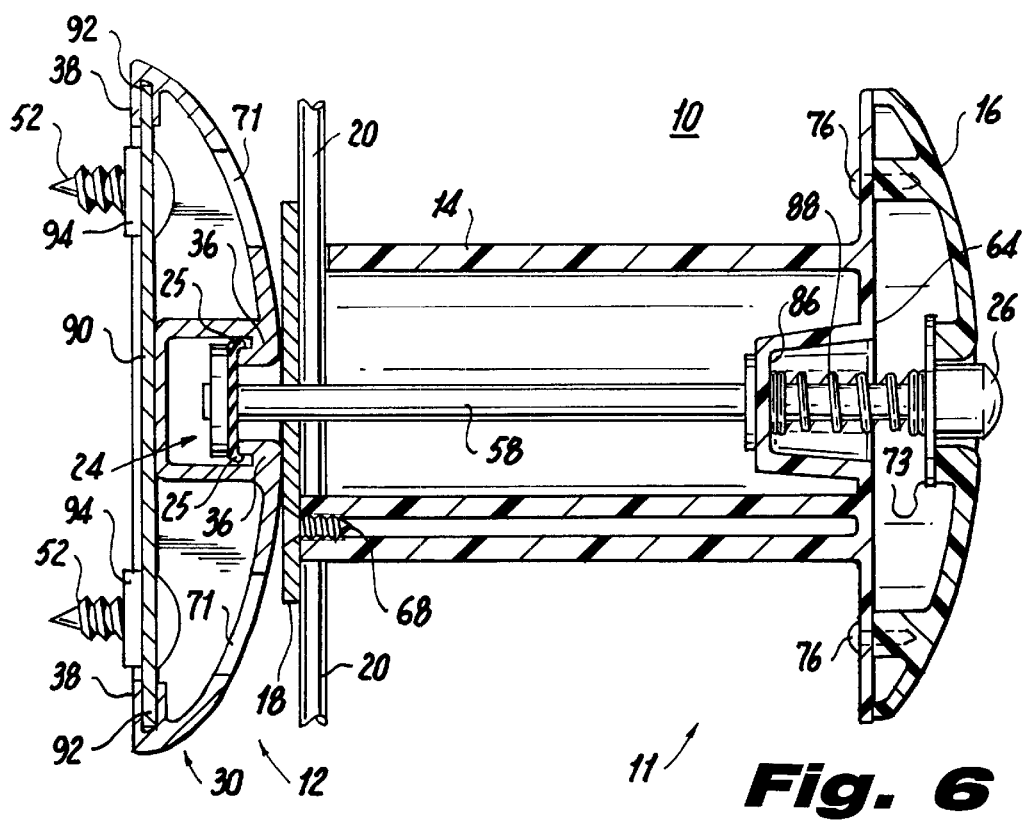
FIG. 6 is a cross-sectional view similar to FIG. 4 of an alternate embodiment cable support.

FIG. 6 is a cross-sectional view, similar to FIG. 4, of another embodiment of the cable support 10. In this alternate embodiment, spool body 14 is secured to spool top 16 with fasteners 72. Button 26 includes a collar 73 and is secured to plunger 58, which in turn is secured to brace 24. Spool body 14 includes a shoulder 64 and a spring seat 86. A resilient member 88 is mounted on plunger 58 and positioned between collar 73 and spring seat 86 such that upon depression and release of button 26, button 26 returns to its pre-depressed position. Shoulder 64 prevents further movement of button 26 when button 26 is depressed and collar 73 contacts shoulder 64. The in-turned flanges 36 are shown clamped between the engagement ribs 25 of brace 24 and the spool base 18. The lateral supports 20 are secured in position between spool body 14 and spool base 18 by way of one or more fasteners 68.

Another embodiment of the spool guide 12 is shown to include track 30 and mounting bracket 90 which includes flat edges 92. The flat edges 92 are engaged with the slots in the slotted flanges 38 of track 30. The mounting bracket 90 can be mounted to a supporting structure 28 prior to assembling the track 30 thereto or the mounting bracket 90 and track 30 can be mounted as a single unit. If the spool guide 12 is assembled prior to mounting, access holes 71 can be provided in track 30 for securing the fasteners 52 to the supporting structure 28. Spacers 94 can be provided on fasteners 52 to space mounting bracket 90 away from the supporting structure 28.

Figure 7:
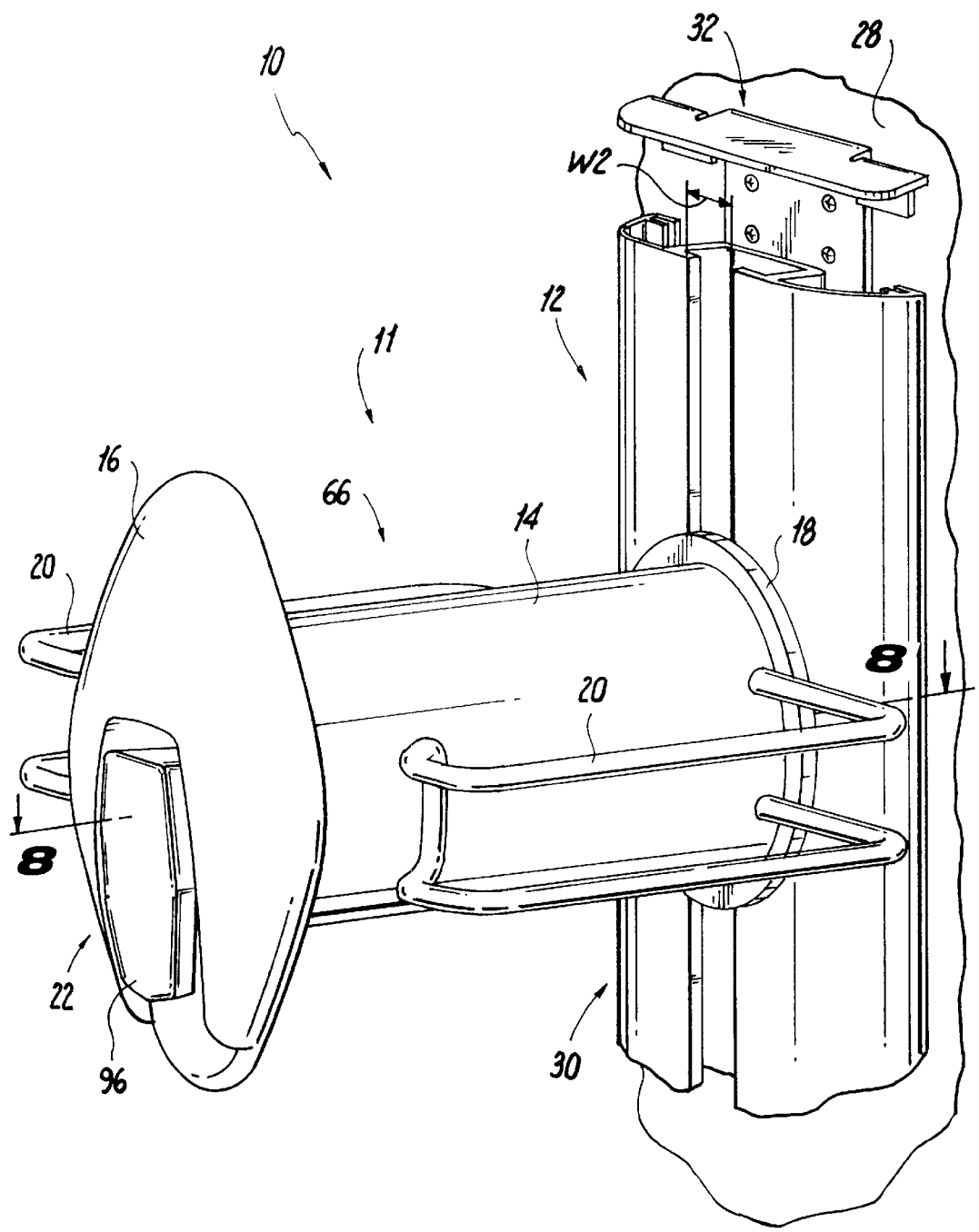
FIG. 7 is a perspective view of an alternate embodiment cable support that may be used in the cable management system illustrated in FIG. 1.

FIG. 7 is a perspective view of another embodiment of cable support 10 including a cable spool 11 and a spool guide 12. The cable spool 11 includes a spool body 14, top 16, base 18, lateral supports 20, and a coupler 22. The spool body 14 and spool top 16 are molded as a single component, thereby forming a uni-piece spool 66. The coupler 22 includes a spring-biased brace 24 (FIG. 8) that is moveable in a direction toward and away from the base 18 by latching and unlatching, respectively, a cam latch 96 located in the center of the spool top 16. The brace 24 includes two engagement ribs 25 and has a width of W1 (FIG. 9C). The cable spool 11 is mounted to a supporting structure 28, such as a cabinet or wall, with the spool guide 12. The spool guide 12 is substantially similar to the spool guide described above and illustrated in FIG. 2.

Figure 8:
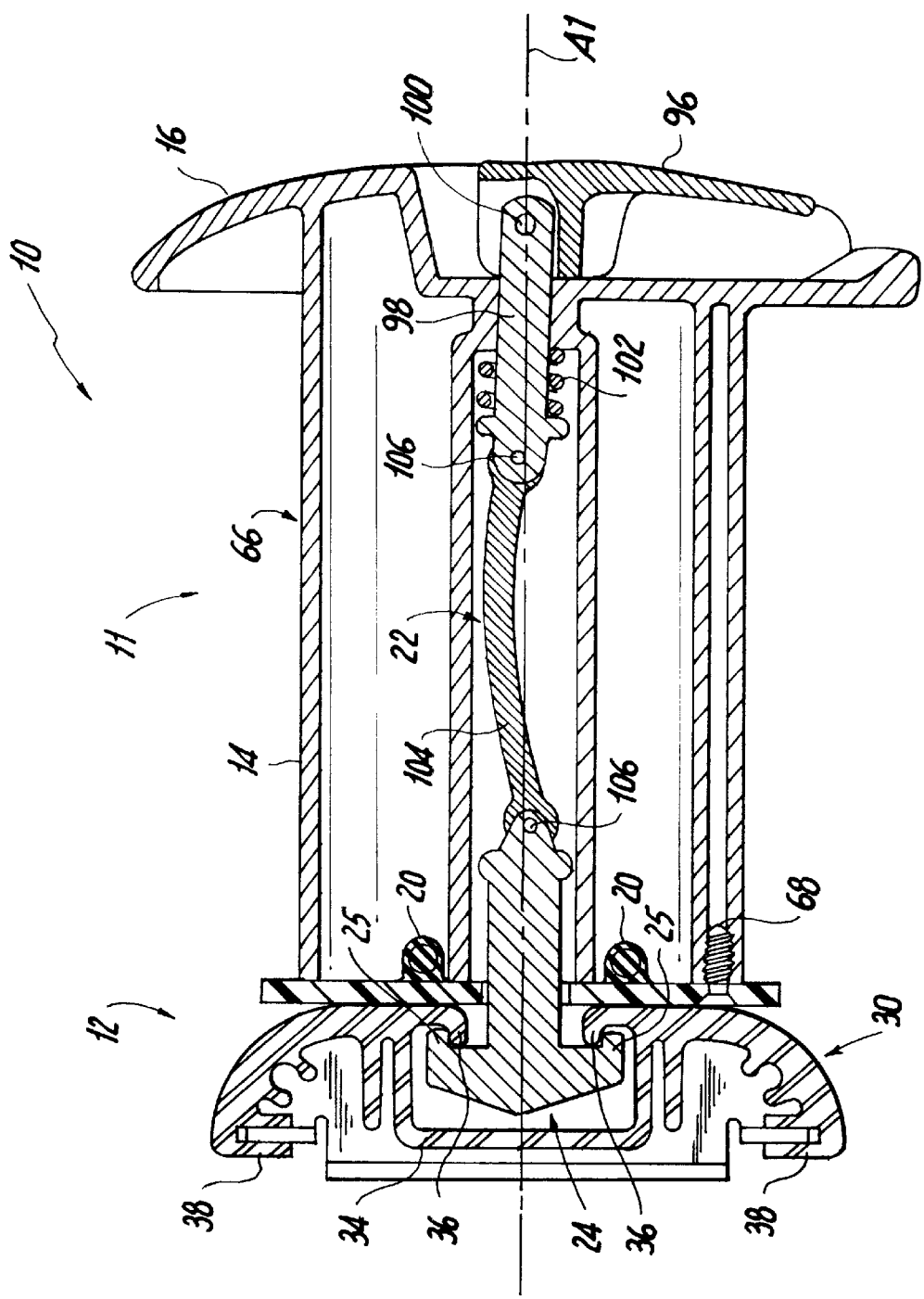
FIG. 8 is a cross-sectional view of the cable support illustrated in FIG. 7 as viewed along line 8—8, wherein the spool body, spool top, lateral supports, and a portion of the coupler has been rotated ninety degrees (90°) to facilitate a description of the embodiment.

FIG. 8 is a cross-sectional view of the cable support 10 as viewed along line 8—8 of FIG. 7, wherein the spool body 14, spool top 16, lateral supports 20, and a portion of the coupler 22 have been rotated ninety degrees (90°) to facilitate its description. The cable spool 11 is shown clamped to the spool guide 12 with the coupler 22. The coupler 22 includes the cam latch 96 pivotally attached to a spring rod 98 by a pin 100. The spring rod 98 is slidingly mounted through an aperture in the spool top 16 and biased toward the spool base 18 by a spring 102 positioned between a shoulder on the spring rod 98 and a shoulder encircling the aperture in the spool top 16. The brace 24 includes a post that is slidingly mounted through an aperture in the spool base 18. A tension member 104 extends between, and is secured to, the brace 24 and the spring rod 98 by pins 106. The tension member provides resiliency between the spring rod 98 and brace 24 during clamping and unclamping as described in more detail below. Those having ordinary skill in the art will appreciate that although the spring rod 98, tension member 104, and brace 24 are shown as three separate components linked by pins 106, they can be unified and manufactured as a single component. When the cable spool 11 is clamped to the spool guide 12 as shown, the in-turned flanges 36 of the track 30 are clamped between the ribs 25 of the brace 24 and the spool base 18.

The lateral supports 20 are secured in position between uni-piece spool 66 and spool base 18 by way of one or more fasteners 68. The lateral supports 20 can be made from a single piece of wire or as separate components.

Figure 9A:
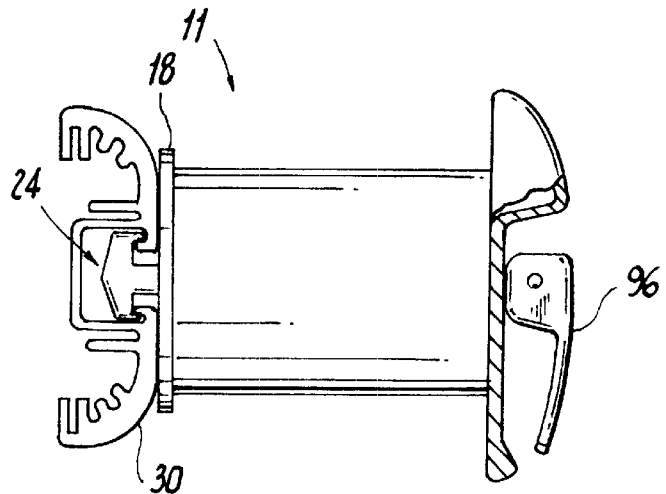
FIGS. 9A–9C illustrate procedures for moving, attaching, and detaching the cable spool illustrated in FIG. 7 with respect to the spool guide.
Figure 9B:
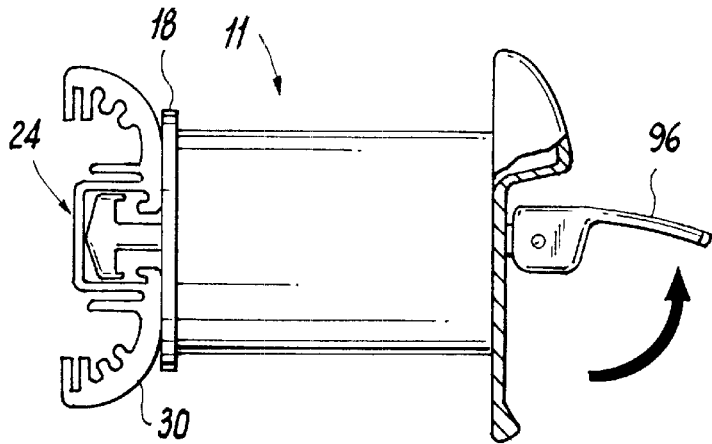
Figure 9C:
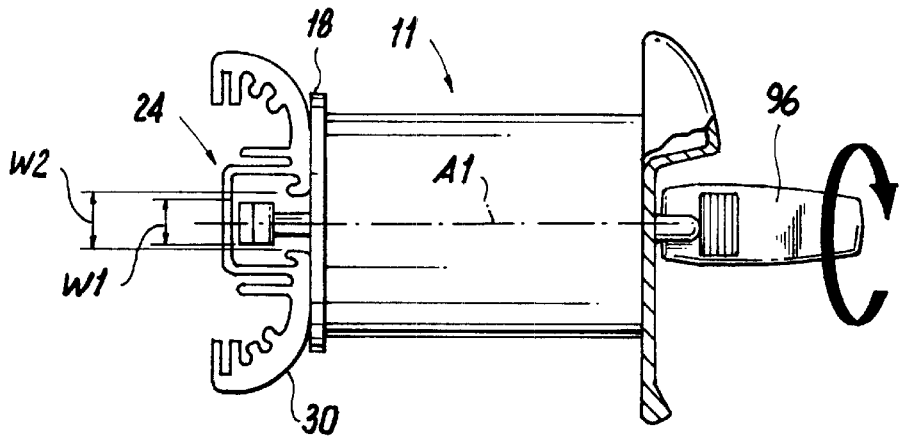

FIGS. 9A–9C are simplified views of the cable support 10 shown in FIG. 8 for illustrating a procedure for moving, detaching and attaching the cable spool 11 with respect to the track 30. FIG. 9A is similar to FIG. 8 in that it shows the cable spool 11 attached to the track 30, wherein the in-turned flanges 36 of the track 30 are clamped between the ribs 25 of the brace 24 and the spool base 18. Referring to FIG. 9B, the cable spool 11 can be moved along the length of the track 30 by first unlatching the cam latch 96 to allow the spring 102 to bias the spring rod 98, tension member 104, and brace 24 toward the track 30 so that the ribs 25 of the brace 24 are separated from the in-turned flanges 36 of the track 30. It is notable that the tension member 104 is sufficiently elastic so it may elongate slightly as the cam latch 96 is moved between the latched position as shown in FIG. 9A and the unlatched position as shown in FIG. 9B.

Referring to FIG. 9C, the cable spool 11 can be removed from the track 30 by first lifting the cam latch 96 as described above and illustrated in FIG. 9B, and then rotating the cam latch 96 ninety degrees (90°) either clockwise or counter-clockwise about axis A1. Thereafter, the width W1 of the brace 24 can be passed through the width W2 of the opening between the in-turned flanges 36 for removal of the cable spool 11. The cable spool 11 can be attached to the track 30 by following the above procedure in reverse order, namely, by passing the brace 24 through the opening between the in-turned flanges 36, rotating the cam latch 96 ninety degrees (90°) in either the clockwise or counter-clockwise direction about axis A1, and latching the cam latch 96.

While the invention has been described with respect to preferred embodiments, those skilled in the art will readily appreciate that various changes and/or modifications can be made to the invention without departing from its spirit or scope as defined by the appended claims. All documents cited herein are incorporated by reference in their entirety.

What is claimed is:

1. A cable management system with adjustable cable spools, comprising:

a spool guide including a pair of flanges separated by a predetermined distance and extending along the length of the spool guide; and a cable spool including a spool body having a first end and a second end, and a coupler mounted to the spool body and having a brace attached to an end of the coupler that is moveable between a first position, wherein the coupler draws the brace toward the first end of the spool body to clamp the flanges between the brace and the first end of the spool body, and a second position, wherein the coupler extends the brace away from the spool body for adjusting the cable spool along the length of the pair of flanges.

2. A cable management system as recited in claim 1, wherein the spool guide further includes a track to which the pair of flanges are attached.

3. A cable management system as recited in claim 2, wherein the spool guide further includes a mounting bracket that is removably mounted to the track.

4. A cable management system as recited in claim 1, wherein the cable spool further includes a spool base that is fastened to the first end of the spool body.

5. A cable management system as recited in claim 4, wherein the cable spool further includes a lateral support mounted to the spool body and secured in place with the spool base.

6. A cable management system as recited in claim 1, wherein the cable spool further includes a spool top that is mounted to the second end of the spool body.

7. A cable management system as recited in claim 1, wherein the coupler further includes a plunger attached to the brace and biased toward the second end of the spool body.

8. A cable management system as recited in claim 7, wherein the plunger further includes a button extending from the second end of the spool body for moving the coupler from the first position to the second position.

9. A cable management system as recited in claim 1, wherein the coupler includes a spring rod slidably mounted to the second end of the spool body, a tension member connecting the brace to the spring rod, and a cam latch attached to the spring rod for moving the coupler from the second position and the first position.

10. A cable management system with adjustable cable spools, comprising:

a spool guide including a track having parallel in-turned flanges that extend along the length of the track so to form an elongated opening; and a cable spool including a spool body, and a coupler mounted to the spool body and having an end that extends between the elongated opening and a brace attached to the end of the coupler that is moveable between a first position, wherein the coupler draws the brace toward the spool body for clamping the in-turned flanges between the brace and the spool body, and a second position, wherein the coupler extends the brace away from the spool body for adjusting the cable spool along the length of the in-turned flanges.

11. A cable management system as recited in claim 10, wherein the spool guide further includes a mounting bracket that is removably mounted to the track.

12. A cable management system as recited in claim 10, wherein the cable spool further includes a spool base fastened to the spool body between the brace and the spool body.

13. A cable management system as recited in claim 12, wherein the cable spool further includes a lateral support mounted to the spool body and secured in place with the spool base.

14. A cable management system as recited in claim 12, wherein the cable spool further includes a spool top that is mounted to an end of the spool body opposite the spool base.

15. A cable management system as recited in claim 10, wherein the coupler further includes a plunger attached to the brace and biased toward the first position.

16. A cable management system as recited in claim 15, wherein the plunger includes a button for moving the coupler from the first position to the second position.

17. A cable management system as recited in claim 10, wherein the coupler includes a spring rod slidably mounted to the spool body, a tension member connecting the brace to the spring rod, and a cam latch attached to the spring rod for moving the coupler from the second position to the first position.

18. A cable management system as recited in claim 10, wherein the brace, when measured in a direction normal to the length of the spool body, has a first dimension that is greater than the width of the elongated opening and a second dimension that is less than the width of the elongated opening so the brace can pass through the elongated opening to allow the cable spool to be separated from the spool guide.

19. A cable management system with adjustable cable spools, comprising:

an electronics cabinet having vertical frame members;

a spool guide mounted to one of the vertical frame members and including a track having parallel in-turned flanges that extend along the length of the track so to form an elongated opening; and a cable spool mounted to the spool guide and including a spool body having a first end and a second end, a spool top mounted to the second end of the spool body, and a coupler mounted to the spool body and having a brace attached to the coupler adjacent the first end of the spool body and moveable between a first position, wherein the coupler draws the brace toward the first end of the spool body for clamping the in-turned flanges between the brace and the first end of the spool body, and a second position, wherein the coupler extends the brace away from the first end of the spool body for adjusting the cable spool in relation to the spool guide.

20. A cable management system as recited in claim 19, wherein the spool guide further includes a mounting bracket removably mounted to the track for mounting the spool guide to the vertical frame member.

21. A cable management system as recited in claim 19, wherein the cable spool further includes a spool base fastened to the first end of the spool body.

22. A cable management system as recited in claim 21 wherein the cable spool further includes a lateral support mounted to the first end of the spool body and secured in place with the spool base.

23. A cable management system as recited in claim 19, wherein the coupler further includes a plunger attached to the brace and biased toward the second end of the spool body.

24. A cable management system as recited in claim 23, wherein the plunger includes a button for moving the coupler from the first position to the second position.

25. A cable management system as recited in claim 19, wherein the coupler includes a spring rod slidably mounted to the second end of the spool body, a tension member connecting the brace to the spring rod, and a cam latch attached to the spring rod for moving the coupler from the second position to the first position.

26. A cable management system as recited in claim 25, wherein the coupler is spring biased in a direction toward the second position.

27. A cable management system as recited in claim 19, wherein the brace, when measured in a direction normal to the length of the spool body, has a first dimension that is greater than the width of the elongated opening and a second dimension that is less than the width of the elongated opening so the brace can pass through the elongated opening to allow the cable spool to be separated from the spool guide.

* * * * *